(12) United States Patent
Vignard et al.

(10) Patent No.: US 11,774,554 B2
(45) Date of Patent: Oct. 3, 2023

(54) ELECTRONIC DEVICE, SYSTEM AND METHOD FOR AUGMENTING IMAGE DATA OF A PASSIVE OPTICAL SENSOR

(71) Applicant: TOYOTA MOTOR EUROPE, Brussels (BE)

(72) Inventors: Nicolas Vignard, Brussels (BE); Victor Romero Cano, Montbonnot (FR); Christian Laugier, Montbonnot (FR)

(73) Assignee: TOYOTA MOTOR EUROPE, Brussels (BE)

( * ) Notice: Subject to any disclaimer, the term of this patent is extended or adjusted under 35 U.S.C. 154(b) by 1020 days.

(21) Appl. No.: 16/471,977

(22) PCT Filed: Dec. 20, 2016

(86) PCT No.: PCT/IB2016/001934
§ 371 (c)(1),
(2) Date: Jun. 20, 2019

(87) PCT Pub. No.: WO2018/115917
PCT Pub. Date: Jun. 28, 2018

(65) Prior Publication Data
US 2019/0353791 A1    Nov. 21, 2019

(51) Int. Cl.
*G01S 7/48* (2006.01)
*G06T 7/174* (2017.01)
(Continued)

(52) U.S. Cl.
CPC ............ *G01S 7/4808* (2013.01); *G01S 17/86* (2020.01); *G01S 17/87* (2013.01); *G01S 17/931* (2020.01); *G06T 7/174* (2017.01)

(58) Field of Classification Search
CPC ...... G01S 13/867; G01S 13/931; G01S 17/42; G01S 17/86; G01S 17/87; G01S 17/931;
(Continued)

(56) References Cited

U.S. PATENT DOCUMENTS

2007/0165967 A1*  7/2007  Ando .................. G01S 17/86
                                                  382/291
2013/0242284 A1    9/2013  Zeng
(Continued)

FOREIGN PATENT DOCUMENTS

EP    1 808 711 A2    7/2007
EP    2 884 305 A1    6/2015

OTHER PUBLICATIONS

Nègre et al.; "Hybrid Sampling Bayesian Occupancy Filter;" 2014 IEEE Intelligent Vehicles Symposium (IV); 2014; pp. 1307-1312; Dearborn, Michigan.
(Continued)

*Primary Examiner* — Christopher S Kelley
*Assistant Examiner* — Ana Picon-Feliciano
(74) *Attorney, Agent, or Firm* — Oliff PLC

(57) ABSTRACT

An electronic device for a vehicle for augmenting image data of a passive optical sensor. The electronic device is configured to: receive first image data of a passive optical sensor, the first image data comprising a plurality of pixels in an image plane, receive second data of an active sensor, the passive optical sensor and the active sensor sensing the same scene outside the vehicle, the active sensor including a plurality of scan areas distributed over the scene, the second data including measurement values at returned scan areas, identify at least one cluster based on the distribution of returned scan areas, project the cluster onto the image plane, identify pixels which match with the projected cluster in the image plane, and associate the identified pixels with second data of the matching cluster. Further relates to a system and a method.

17 Claims, 4 Drawing Sheets

(51) Int. Cl.
G01S 17/87 (2020.01)
G01S 17/86 (2020.01)
G01S 17/931 (2020.01)

(58) Field of Classification Search
CPC .......... G01S 2013/9323; G01S 7/4808; G06T 7/174; G06V 20/58
USPC ............... 356/4.01; 348/42, 207.99, 348
See application file for complete search history.

(56) References Cited

U.S. PATENT DOCUMENTS

2014/0035775 A1 2/2014 Zeng et al.
2015/0170526 A1* 6/2015 Wang .................. G06V 20/13
 701/16
2016/0047900 A1 2/2016 Dussan
2016/0125626 A1* 5/2016 Wang .................. G06T 11/005
 348/47

OTHER PUBLICATIONS

Achanta et al.; "SLIC Superpixels Compared to State-of-the-Art Superpixel Methods;" IEEE Transactions on Pattern Analysis and Machine Intelligence; 2012; pp. 2274-2281; vol. 34, No. 11.
Piniés et al.; "Too Much TV is Bad: Dense Reconstruction from Sparse Laser with Non-convex Regularisation;" 2015 IEEE International Conference on Robotics and Automation (ICRA); 2015; pp. 135-142; Seattle, Washington.
Gerardo-Castro et al.; "Non-Parametric Consistency Test for Multiple-Sensing-Modality Data Fusion;" 18th International Conference on Information Fusion; 2015; pp. 443-451; Washington, D.C.
Romero-Cano et al.; "A variational approach to simultaneous multi-object tracking and classification;" The International Journal of Robotics Research; 2016; pp. 654-671; vol. 35, No. 6.
Luo et al.; "Multisensor Fusion and Integration: Approaches, Applications, and Future Research Directions;" IEEE Sensors Journal; 2002; pp. 107-119; vol. 2, No. 2.
Wang et al.; "Regionlets for Generic Object Detection;" International Conference on Computer Vision (ICCV); 2013.
Kaestner et al.; "Generative Object Detection and Tracking in 3D Range Data;" 2012 IEEE International Conference on Robotics and Automation; 2012; pp. 3075-3081; Saint Paul, Minnesota.
Rother et al.; "Interactive Foreground Extraction using graph cut;" Microsoft Technical Report; 2011.
Sep. 13, 2017 Search Report issued in International Patent Application No. PCT/IB2016/001934.
Jun. 25, 2019 International Preliminary Report on Patentability issued in International Patent Application No. PCT/IB2016/001934.
Boykov et al.; "Basic Graph Cut Algorithms;" Markov Random Fields for Vision and Image Processing (edited by Blake et al.); 2011; pp. 31-47; The MIT Press, Cambridge, Massachusetts.
Dempster et al.; "Maximum Likelihood from Incomplete Data via the EM Algorithm;" Journal of the Royal Statistical Society, Series B (Methodological); 1977; pp. 1-38; vol. 39, No. 1.

* cited by examiner

ELECTRONIC DEVICE, SYSTEM AND METHOD FOR AUGMENTING IMAGE DATA OF A PASSIVE OPTICAL SENSOR

FIELD OF THE DISCLOSURE

The present disclosure is related to an electronic device, system and method for a vehicle for augmenting image data of a passive optical sensor.

BACKGROUND OF THE DISCLOSURE

Modern vehicles include object detection algorithms that are used to enable collision warning or avoidance and other active safety applications. Such an intelligent vehicle has to perceive and recognize the scene around it in all kind of weather. This goal means it needs to detect every obstacle without suffering from a whole range of environmental conditions. In order to detect an obstacle, the environment is perceived through sensors. High scene understanding needs camera space information to detect obstacles. However, challenging weather such as rain, fog or snow may deteriorate the perceived image.

It has been proposed to use several types of sensors and mixing active and passive sensors. Introducing an architecture with active sensors (Lidar, Radar . . . ) and passive sensors (camera, inertial sensor) can improve the perception of the scene. For example, in the fog, a camera can perceive close obstacles whereas a Lidar can detect far objects. Accordingly, perception can be performed by collecting measurements from sensors and then processing this information in order to generate knowledge about both the layout of the environment and the objects in it.

Passive sensors such as cameras for example, are inexpensive and provide dense and rich appearance information. The image information they provide is however very sensitive to environmental changes and current computer vision algorithms suffer from performance drops when processing such image information. Even with a little rain or a sunny weather these algorithms are challenged to detect obstacles.

Active sensors such as lasers on the other hand, provide sparser depth and heading measurements. Point clouds generated by a laser or images recorded by a camera have been extensively used to detect generic objects in urban environments.

Generic object detection in lidar and camera data respectively has been proposed by several works, e.g.:

R. Kaestner, J. Maye, Y. Pilat, and R. Siegwart. Generative object detection and tracking in 3D range data. IEEE International Conference on Robotics and Automation (ICRA), pages 3075-3081, may 2012, X. Wang, M. Yang, S. Zhu, and Y. Lin. Regionlets for generic object detection. International Conference on Computer Vision (ICCV), 2013.

At a high level, these methods cluster sensor data into groups that individually correspond to objects in the environment. Although these one-sensor-modality-based methods have in general, a state-of-the-art performance, there are adverse environmental conditions that limit the usability of the data provided by the individual sensors they utilize. Airborne dust for example, can significantly increase the noise in depth measurements, whereas illumination variations make some portions of the image too bright or too dark and therefore unusable.

Multi-sensor data fusion is a promising way for achieving all-weather-conditions perception. It allows vehicles, i.e. robotic systems, to compensate for the weaknesses of a given sensor modality using the strengths of another complementary one. Sensor fusion methods can be classified according to the level of abstraction at which fusion is performed, described by R. C. Luo, C.-C. Yih, and K. L. Su. Multisensor fusion and integration: approaches, applications, and future research directions; IEEE Sensors Journal, 2(2):107-119, 2002.

High level fusion methods perform estimation using each sensor modality independently and then approach the fusion of these estimates as a data association problem. These approaches require independent estimation machinery for each sensor modality which makes them not only overly complex but also disregard raw information that could be valuable for the fusion process.

There is an increasing number of estimation frameworks that make use of a lower level data representation where raw measurements from all sensing modalities are consider in the fusion process, as proposed for instance by V. Romero-Cano, G. Agamennoni, and J. Nieto. A variational approach to simultaneous multi-object tracking and classification; the International Journal of Robotics Research (IJRR), 35(6): 654-671, 2015. In this work it is proposed to perform multimodal motion detection, semantic segmentation and sensor calibration respectively, based on per-pixel appearance and geometric features, utilising unified and sound methods for processing all sensor modalities at once. Such an approach requires sensor measurements to densely cover the measured scene. Therefore there is a need of low- or pixel-level multi-modal fusion methods that transform raw sensor data into a common and dense representation that can eventually be processed by a unified recognition method.

There are some works in the literature that approach this lowlevel fusion problem using non-parametric or energy-based approaches, cf. e.g.:

M. P. Gerardo-Castro, T. Peynot, F. Ramos, and R. Fitch. Non-Parametric Consistency Test for Multiple-Sensing-Modality Data Fusion; IEEE International Conference on Information Fusion (FUSION), pages 443-451, 2015, and P. Pinies, L. M. Paz, and P. Newman. Too Much TV is Bad: Dense Reconstruction from Sparse Laser with Non-convex Regularisation; IEEE International Conference on Robotics and Automation (ICRA), 2015.

These approaches however require all sensor modalities to be similarly dense.

A further system for fusing the outputs from multiple LiDAR sensors on a vehicle is known from US2013242284 (A1). The system includes cueing the fusion process in response to an object being detected by a radar sensor and/or a vision system.

SUMMARY OF THE DISCLOSURE

Currently, it remains desirable to provide an electronic device, system and method for augmenting image data of a passive optical sensor with active sensor data, wherein the sensor data fusion is independent of the scene coverage of any of the sensors.

Therefore, according to the embodiments of the present disclosure, it is provided an electronic device (in particular for a vehicle) for augmenting image data of a passive optical sensor. The electronic device being configured to:

receive first image data of a passive optical sensor, the first image data comprising a plurality of pixels in an image plane, receive second data of an active sensor, the passive optical sensor and the active sensor sensing the same scene (in particular outside the vehicle), the active sensor comprising a plurality of scan areas distributed over the scene, the second data comprising measurement values at returned scan areas, identify at least one cluster based on the distribution of returned scan areas, project the cluster onto the image plane, and identify pixels which match with the projected cluster in the image plane, and associate said identified pixels with second data of the matching cluster.

By providing such an electronic device, low-level multi-sensor data fusion in the pixel space can be obtained. The second data desirably comprise measurement values only at returned scan areas, i.e. at those positions of the scene where an object has reflected the scan signal sent out by the active sensor. Such positions may form together a cluster which desirably represents the object. Consequently, only the matching pixels (i.e. being within the cluster border) are desirably associated with second data. In other words, the other pixels (i.e. not within a cluster border) are desirably not associated with second data.

A scan area may be restricted as much as possible to a point, e.g. by using a laser as scan signal. In other words, the scan area may be a scan point.

Hence, the electronic device is independent of the scene coverage of any of the sensors. Accordingly, a new image-like data representation can be achieved where each pixel contains not only e.g. colour but also other low level features such as e.g. depth and object IDs.

In order to identify a cluster, scan area returns (i.e. returned scan areas) may be grouped into coherent segments that can potentially correspond to an individual cluster (which may correspond to an detected object in the scene). This stage can also be called as cluster (object) hypotheses generation.

The electronic device may further be configured to project the second data onto the image plane by transforming the coordinate system of the second data such that it matches with the coordinate system of the first image data.

Accordingly, the scan areas may be projected onto the image plane so that depth information (and further information contained by the second data) is available for some pixels in order for the electronic device to perform optimally. For this purpose, the sensors are desirably aligned properly with the vehicle. For example, if a sensor detects an object that is actually in the path of the host vehicle but, due to sensor misalignment, the sensor determines that the object is slightly to the left of the path of the host vehicle, this can have significant consequences for the electronic device. Even if there are multiple forward looking sensors on a vehicle, it is desirable that they are all aligned properly, so as to minimize or eliminate conflicting sensor readings. In other words calibration of the sensors is desired.

The electronic device may further be configured to determine for each cluster a set of state information based on measurement values at returned scan areas within the cluster, the set of state information including at least one of the distance, the size, and/or the velocity of the cluster.

A cluster may be determined by an occupancy grid mapping algorithm.

Each associated pixel may comprise image information and state information of the associated cluster, meanwhile each pixel, which is not associated with a cluster, may only comprise image information.

The electronic device may be further configured to:

decompose the first image data into a set of superpixels, a superpixel comprising a plurality of neighboring pixels, and define an object of interest in the image plane by associating neighboring superpixels with a matching cluster.

Accordingly, locally homogeneous areas in the scene may be determined by a superpixel segmentation. Furthermore, an object of interest in the image plane may be defined by combining neighboring superpixels matching with the same cluster. Accordingly, a mapping between cluster (object) hypotheses and super-pixels may be provided. This mapping may express which pixels in the image space can be associated with cluster (object) hypotheses obtained from the scan areas. An object of interest may be any object recognized in the scene, e.g. another vehicle.

A superpixel may be determined by identifying neighboring pixels with a similar color distribution and/or by identifying edges in the first image data, in particular by using a simple linear iterative clustering (SLIC) algorithm.

Simple Linear Iterative Clustering (SLIC) is a relatively simple and parallelizable method, based on k-means clustering, for decomposing an image into a regular grid of visually homogeneous regions or so-called super-pixels, as further described in R. Achanta, A. Shaji, K. Smith, A. Lucchi, P. Fua, and S. Süsstrunk. SLIC superpixels compared to state-of-the-art superpixel methods. IEEE Transactions on Pattern Analysis and Machine Intelligence (TPAMI), 34(11):2274-2281, 2012.

As a result, SLIC super-pixels desirably provide a regular grouping of image pixels according to their distance both spatially and in the colour space.

The electronic device may be further configured to associate a superpixel, in particular each pixel of the super pixel, with second data of the matching cluster, in particular with the set of state information of the matching cluster.

Accordingly, a super-pixel-guided extrapolation may be carried out, in order to assign projected second data, e.g. depth values (obtained by projecting the clustered scan areas onto the image) to nearby pixels. These nearby pixels may be defined by the super-pixel assigned to the projected point. For example; in a relatively simple inter/extrapolation, the same depth is assigned to all pixels in a super pixel.

The electronic device may be further configured to create an object appearance model of the object of interest, the appearance model representing an estimation for the color distribution of the object of interest.

Accordingly, in a segmentation initialisation, for each cluster (object hypothesis), the super-pixels may be assigned with a depth value. A Gaussian Mixture Model (GMM) for instance may be created that represents an initial guess for the overall colour distribution of the cluster (object) hypothesis.

The electronic device may be further configured to create a background appearance model based on superpixels surrounding the object of interest, the background appearance model representing an estimation for the color distribution of a background in the scene.

Accordingly, surrounding super-pixels may also be used to create a GMM that is used as a background model.

The electronic device may be further configured to redefine the border of the object of interest based on the object appearance model of the object of interest and/or the background appearance model, in particular by using an energy minimisation method, e.g. by using a graph cut algorithm.

Accordingly, in a self-supervised object segmentation depth densification in the image space may be carried out. In order to do so, the initial object and background models may be used. Further, a graph-cut algorithm may be applied to them, in order to extend and refine the initial super-pixel-based segmentation.

The electronic device may be further configured to associate each pixel of the redefined object of interest with second data of the object of interest, in particular with the set of state information of the object of interest.

Accordingly, a global feature densification may be carried out. In order to do so, for each cluster (object hypothesis) the second data (e.g. depth values) from the super-pixel-based densification may be further expanded to cover the entire outline provided by the graph-cut segmentation obtained in the previous step.

The passive optical sensor may be a digital camera.

Camera sensors may detect objects such as pedestrians, cars, traffic lights, traffic signs, etc. A digital camera may provide relatively dense data (pixel space), color and appearance of objects. This information is desirable to understand the scene around the vehicle. However, this sensor is often dependent on the light so it could suffer from sunny weather (over exposed pixels), night (under exposed pixels), rain (rain drop).

The active sensor may be a radar or an active optical sensor, in particular a laser sensor and/or a LiDAR sensor.

LiDAR sensors may detect objects and provide range measurements to those objects. LiDAR sensors are desirable because they are able to provide the heading of a tracked object, which other types of sensors, such as vision systems and radar sensors, are generally unable to do. For one type of LiDAR sensors, reflections from an object may be returned as a scan area as part of a point cluster range map. A separate scan area may be provided for every ½° across the field-of-view of the sensor. Therefore, if a target vehicle is detected in front of the host vehicle, there may be multiple scan areas that are returned that identify the distance of the target vehicle from the host vehicle.

The invention further relates to a system (in particular for a vehicle) for augmenting image data of a passive optical sensor, comprising:
an electronic device as described above,
a passive optical sensor, and
an active sensor, wherein
the passive optical sensor and the active sensor are positioned to sense the same scene (in particular outside the vehicle).

The invention further relates to a vehicle comprising a system as described above. However, the invention may also relate to any robotic system comprising a system as described above.

Finally, the invention relates also to a method of augmenting image data of a passive optical sensor (in particular of a vehicle). The method comprises the steps of:
receiving first image data of a passive optical sensor, the first image data comprising a plurality of pixels in an image plane,
receiving second data of an active sensor, the passive optical sensor and the active sensor sensing the same scene (in particular outside the vehicle), the active sensor comprising a plurality of scan areas distributed over the scene, the second data comprising measurement values at returned scan areas,
identifying at least one cluster based on the distribution of returned scan areas,
projecting the cluster onto the image plane,
identifying pixels which match with the projected cluster in the image plane, and
associating said identified pixels with second data of the matching cluster.

The method may comprise further method steps which correspond to the functions of the electronic device as described above. The further desirable method steps are described in the following.

The second data may be projected onto the image plane by transforming the coordinate system of the second data such that it matches with the coordinate system of the first image data.

For each cluster a set of state information may be determined based on measurement values at returned scan areas within the cluster, the set of state information including at least one of the distance, the size, and/or the velocity of the cluster.

A cluster may be determined by an occupancy grid mapping algorithm.

Each associated pixel may comprise image information and state information of the associated cluster, meanwhile each pixel, which is not associated with a cluster, may only comprise image information.

The first image data may be decomposed into a set of superpixels, a superpixel comprising a plurality of neighboring pixels.

An object of interest in the image plane may be defined by associating neighboring superpixels with a matching same cluster.

A superpixel may be determined by identifying neighboring pixels with a similar color distribution and/or by identifying edges in the first image data, in particular by using a simple linear iterative clustering (SLIC) algorithm.

A superpixel, in particular each pixel of the super pixel, may be associated with second data of the matching cluster, in particular with the set of state information of the matching cluster.

An object appearance model of the object of interest may be created. The appearance model may represent an estimation for the color distribution of the object of interest.

A background appearance model may be created based on superpixels surrounding the object of interest. The background appearance model may represent an estimation for the color distribution of a background in the scene.

The border of the object of interest may be redefined based on the object appearance model of the object of interest and/or the background appearance model, in particular by using an energy minimisation method, e.g. by using a graph cut algorithm.

Each pixel of the redefined object of interest may be associated with second data of the object of interest, in particular with the set of state information of the object of interest.

The described electronic device, system and method may be suitable for any kind of robotic system, not only for vehicles.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, and serve to explain the principles thereof.

DESCRIPTION OF THE EMBODIMENTS

Reference will now be made in detail to exemplary embodiments of the disclosure, examples of which are illustrated in the accompanying drawings. Wherever possible, the same reference numbers will be used throughout the drawings to refer to the same or like parts.

Figure 1:
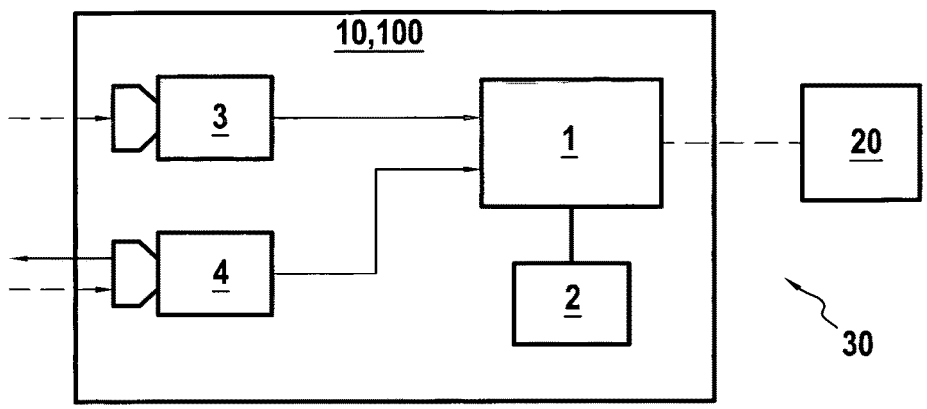
FIG. 1 shows a block diagram of a system with an electronic device according to embodiments of the present disclosure.

FIG. 1 shows a block diagram of a system 10 with an electronic device 1 according to embodiments of the present disclosure. The system may have various functions, e.g. may be a robotic system. For example it may be moveable, e.g. has drivable wheels, and it may have means for retrieving an object, e.g. at least one gripper. It may further be integrated in or constitute a vehicle 100.

The electronic device 1 carries out a computer vision algorithm for detecting the presence and location of objects in a sensed scene. For example, vehicles and other objects may be detected, and an application software uses the object detection information to provide warnings or take actions as appropriate. The electronic device 1 may additionally carry out further functions in the system 10 and/or the vehicle 100. For example, the electronic device may also act as the general purpose ECU (electronic control unit) of the system. The electronic device 1 may comprise an electronic circuit, a processor (shared, dedicated, or group), a combinational logic circuit, a memory that executes one or more software programs, and/or other suitable components that provide the described functionality. In other words, device 1 may be a computer device. The device 1 may be connected to a memory 2, which may store data, e.g. a computer program which when executed, carries out the method according to the present disclosure.

The electronic device 1 is further connected to a passive optical sensor 3, in particular a digital camera. The digital camera 3 is configured such that it can record a scene in front of the vehicle 100, and in particular output digital data providing appearance (color) information of the scene.

The electronic device 1 is further connected to an active sensor 4, in particular a LiDAR sensor, a laser sensor, an ultrasound sensor, or a radar sensor. The active sensor may be a radar or an active optical sensor, in particular a laser sensor and/or a LiDAR sensor.

The outputs of the passive sensor 3 and the active sensor 4 are transmitted to the electronic device 1. Desirably, the outputs are transmitted instantaneously, i.e. in real time or in quasi real time. Hence, a sensed object can also be recognized by the electronic device in real time or in quasi real time.

The system 10 may be additionally connected to an external server 20, in order to form together a system 30. The server 20 may be used to provide and eventually update the algorithms carried out by the electronic device 1. Device 1 may be connectable to the server. For example the electronic device 1 may be connected to the server 20 via a wireless connection. Alternatively or additionally the electronic device 1 may be connectable to the server 20 via a fixed connection, e.g. via a cable.

Figure 2:
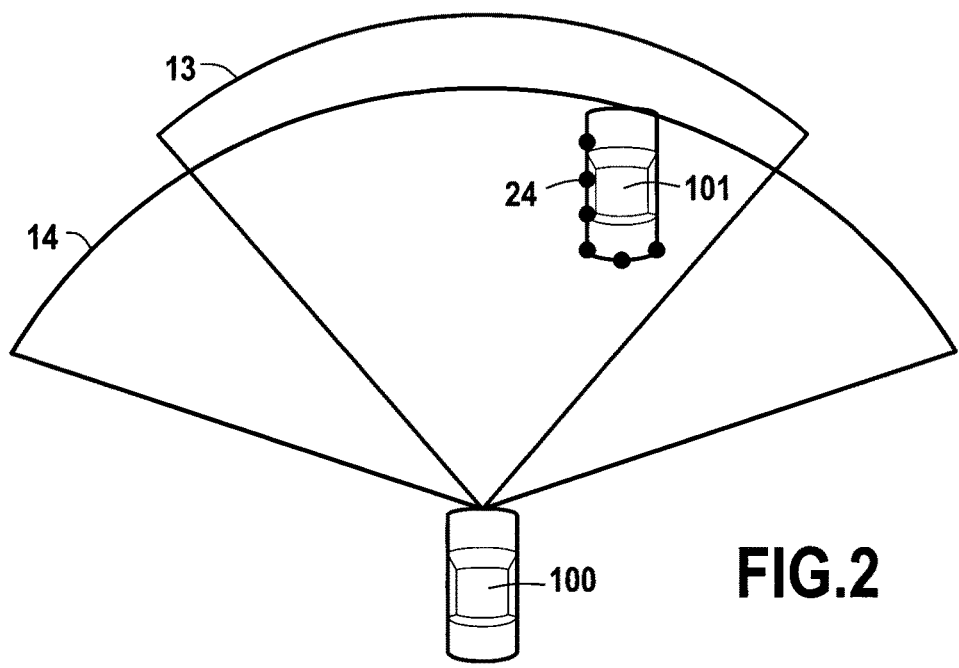
FIG. 2 shows a schematic scene in bird eye sensed by the system view according to embodiments of the present disclosure.

FIG. 2 shows a schematic scene in bird eye sensed by the system view according to embodiments of the present disclosure.

The vehicle 100 scans a scene in front of it with the digital camera 3 having a field of view 13 and with a LiDAR sensor 4 having a field of view 14.

Camera sensors may detect objects such as pedestrians, cars (as the target vehicle 101), traffic lights, traffic signs, etc. A digital camera may provide relatively dense data (pixel space), color and appearance of objects. This information is desirable to understand the scene around the vehicle. However, this sensor is often dependent on the light so it could suffer from sunny weather (over exposed pixels), night (under exposed pixels), rain (rain drop).

LiDAR sensors may detect objects and provide range measurements to those objects. LiDAR sensors are desirable because they are able to provide the heading of a tracked object, which other types of sensors, such as vision systems and radar sensors, are generally unable to do. For one type of LiDAR sensor, reflections from an object may be returned as a scan area (or scan point) 24 as part of a point cluster range map. In the following a scan area 24 is addressed to a scan point 24. A separate scan point 24 may be provided for every ½° across the field-of-view of the sensor. A target vehicle 101 is detected in front of the host vehicle 100. Thus there are multiple scan points 24 that are returned that identify the distance of the target vehicle 101 from the host vehicle 100.

Figure 3:
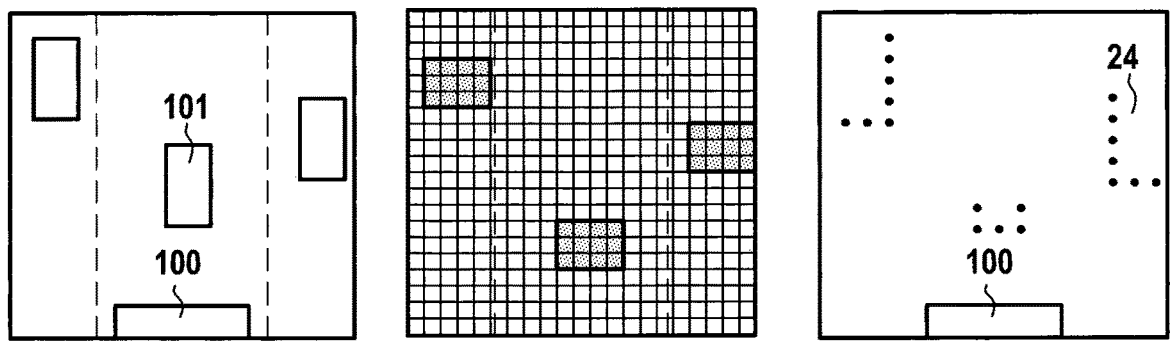
FIG. 3 shows the sensed raw data (first and second data) of the scene in bird eye of FIG. 2.

FIG. 3 shows the sensed raw data (first and second data) of the scene in bird eye of FIG. 2. FIG. 3 shows in A the actual scene with the host vehicle 100 and a target vehicle 101 (an object to be detected in the scene) in front of it. In B the pixel space (first data) is shown as generated by the camera 3 sensing the same scene. The pixel space comprises a plurality of pixels. In C the LiDAR points or scan points (second data) is shown as generated by the active sensor 4 sensing the same scene.

Figure 4:
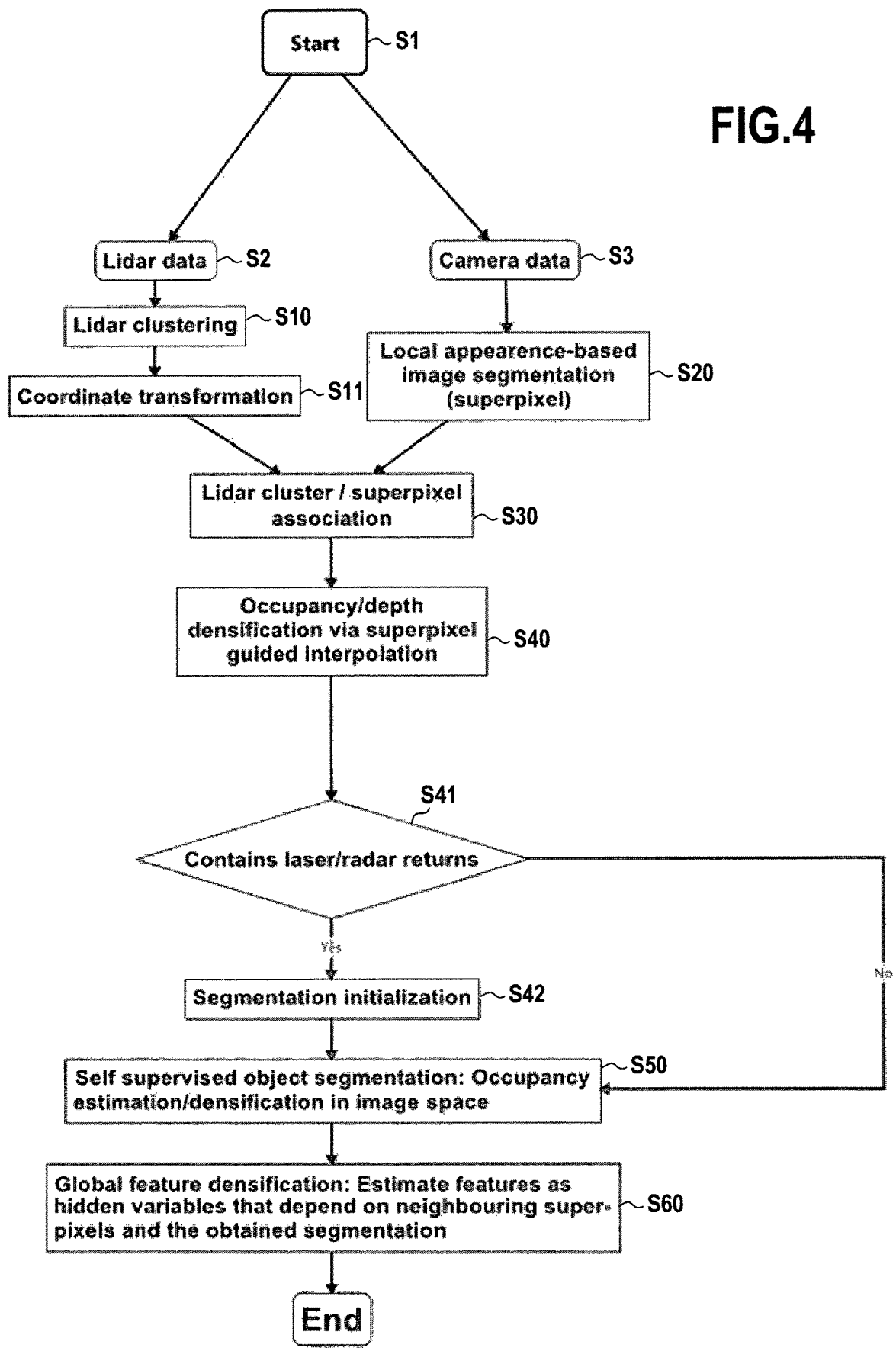
FIG. 4 shows a schematic flow chart illustrating an exemplary method of augmenting image data of a passive optical sensor according to embodiments of the present disclosure.
Figure 5:
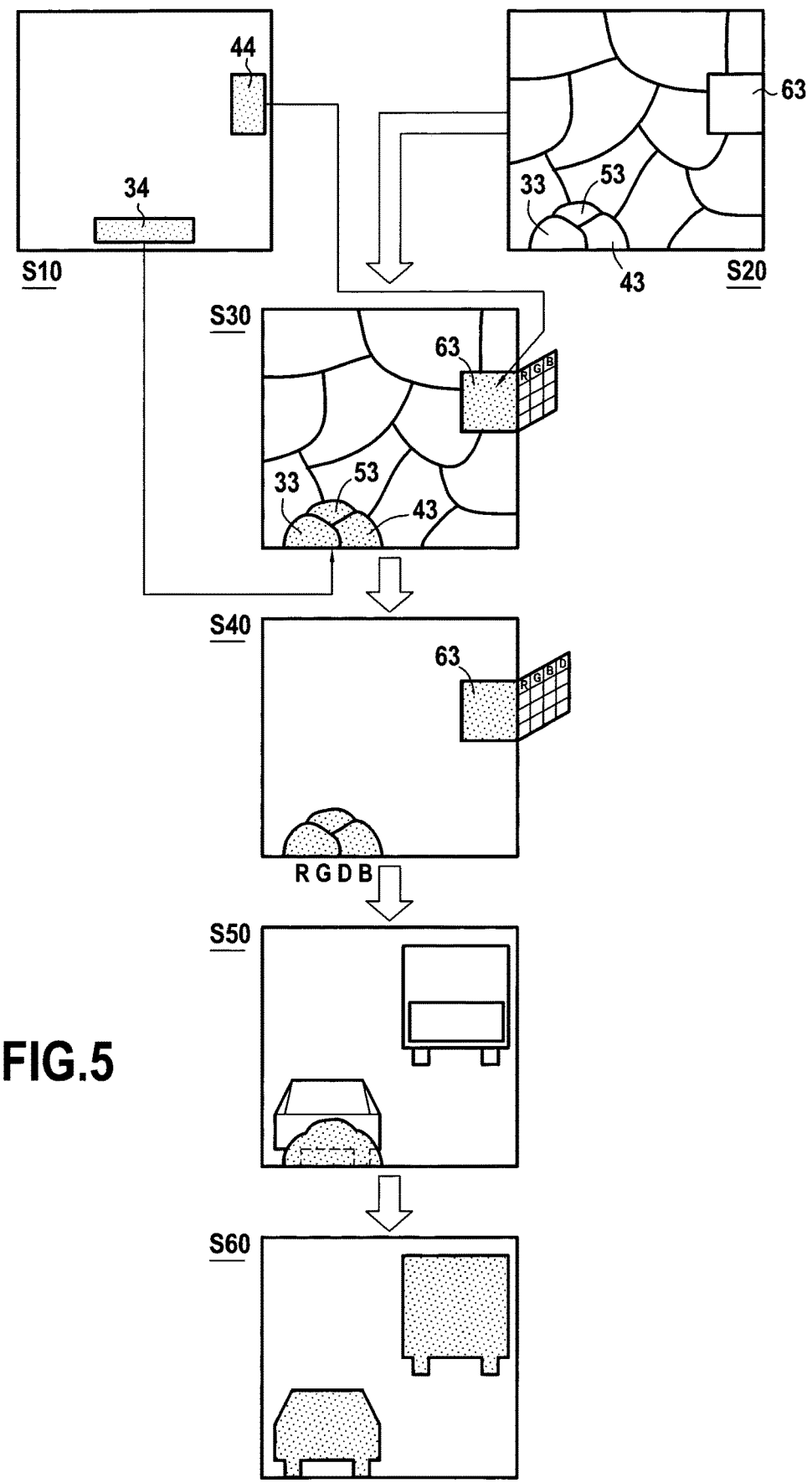
FIG. 5 shows a flow chart schematically illustrating the exemplary method of FIG. 4 in context of a specific example.

FIG. 4 shows a schematic flow chart illustrating an exemplary method of augmenting image data of a passive optical sensor according to embodiments of the present disclosure. FIG. 5 shows a flow chart schematically illustrating the exemplary method of FIG. 4 in context of a specific example.

In step S1 the method is started. In step S2 LiDAR data (second data) are generated by the LiDAR sensor. In step S10 LiDAR clustering is carried out, in order to identify clusters 34, 44, as shown in FIG. 5. This step groups lidar returns into coherent segments that can potentially correspond to individual cluster (objects). This stage can also be called cluster (object) hypotheses generation. In step S11 a coordinate transformation is carried out. Accordingly, a scan point cloud is projected onto the image plane so that depth information is available for some pixels.

In step S3 camera data (first data) are generated by the digital sensor. In step S20 local appearance-based image segmentation is carried out. Accordingly, the SLIC algorithm may be used for super pixel segmentation, in order to divide the image into sets of nearby pixels with a similar colour distribution. By this, super pixels 33, 43, 53, 63 can be determined, as shown in FIG. 5.

In step S30 lidar cluster—super-pixel association is carried out. In this step a mapping is established between lidar-based cluster (object) hypotheses 34, 44 and super-pixels 33, 43, 53, 63, as shown in FIG. 5. This mapping informs which pixels in the image space can be associated with cluster (object) hypotheses obtained from the lidar (or any other active sensor), e.g. cluster 44 with superpixel 63 in FIG. 5.

In step S40 depth densification via super-pixel-guided inter/extrapolation is carried out. Accordingly, the mapping from the previous step is used, and projected depth values (i.e. second data) are assigned to nearby pixels, as shown in FIG. 5 in context of superpixel 63. The projected depth values may be obtained by projecting the clustered scan points onto the image. These nearby pixels are defined by the super-pixel assigned to the projected point. Inter/extrapolation may be carried out by assigning the same depth to all pixels in a super pixel.

In step S41 it is determined for each pixel, whether it is associated with second data, i.e. whether it contains lidar returns. In the example of FIG. 5 this is true for all pixels contained by superpixels 33, 43, 53 and 63. This determination may be done for each cluster (object) hypothesis and for each super-pixel within a given cluster (object) hypothesis.

In step S42 segmentation initialization is carried out. Accordingly, for each cluster (object) hypothesis, this module takes the super-pixels with a depth value assigned to them (in FIG. 5 superpixels 33, 43, 53 and 63) and creates a Gaussian Mixture Model (GMM) that represents an initial guess for the overall colour distribution of the cluster (object) hypothesis. Surrounding super-pixels are also used to create a GMM that is used as a background model.

In step S50 self-supervised object segmentation is carried out, in order to obtain depth densification in the image space. This step takes the initial models provided by the previous step and using the graph-cuts algorithm, extends and refines the initial super-pixel-based segmentation. In the example of FIG. 5, the border (i.e. outline) of a vehicle corresponding to the super pixels 33, 43, 53 is e.g. recognized in this step. Furthermore, the border of a vehicle corresponding to the super pixel 63 is recognized. These vehicles constitute objects of interest in the scene.

In step S60 global feature densification is carried out. In this step, for each cluster (object) hypothesis the depth values from the super-pixel-based densification are further expanded to cover the entire outline provided by the graph-cut segmentation obtained in the previous step. In the example of FIG. 5, all pixels of a detected vehicle in the scene are thus associated with the depth values (second data).

Figure 6:
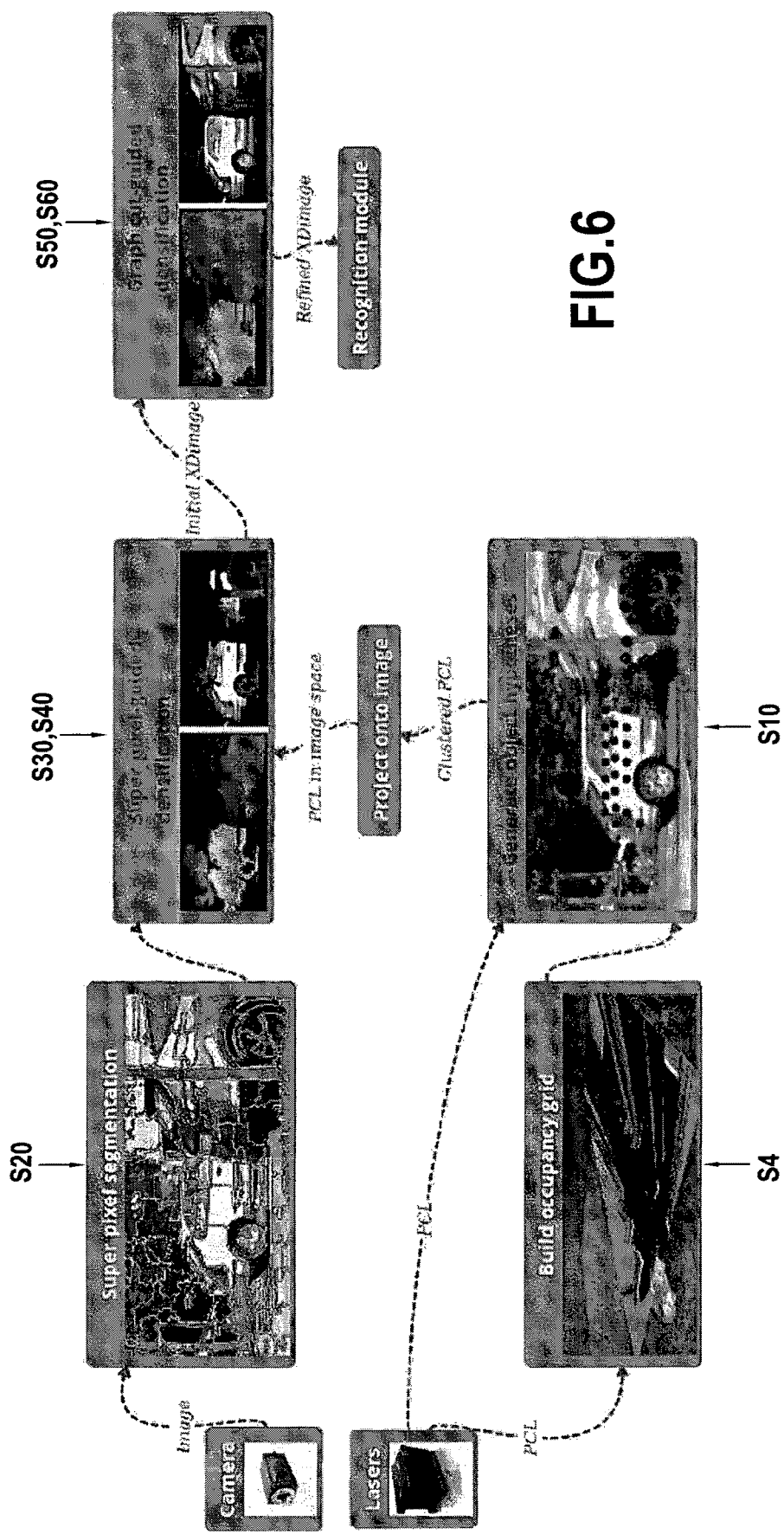
FIG. 6 shows a further flow chart corresponding to the exemplary method of FIG. 4.

FIG. 6 shows a further flow chart corresponding to the exemplary method of FIG. 4. Corresponding steps are consequently indicated by similar reference numbers, wherein these steps are not again explained in detail. However, some aspects of the present disclosure are further explained in context of FIG. 6.

In step S20 range measurements are first projected on the image space. These sparse depth measurements are locally extended using Simple Linear Iterative Clustering. Simple Linear Iterative Clustering (SLIC) is a relatively simple and parallelizable method, based on k-means clustering, for decomposing an image into a regular grid of visually homogeneous regions or so-called super-pixels. As a result, SLIC super-pixels desirably provide a regular grouping of image pixels according to their distance both spatially and in the colour space.

This super-pixel segmentation is used for two complementary tasks. First, the super-pixels are used in steps S30, S40 to assign depth values to all of the pixels within super-pixels with at least one range measurement. The super-pixel segmentation along with the object hypotheses explained in the following section, are then used for computing an accurate initialisation of object-wise appearance models that will guide a final extrapolation/segmentation stage which is explained in context of steps S50, S60.

Furthermore in steps S4 and S10, in order to generate object hypothesis from the active sensor, the occupancy grid may be utilized, e.g. provided by the Hybrid Sampling Bayesian Occupancy Filter (HSBOF), cf. A. Negre, L. Rummelhard, and C. Laugier. Hybrid Sampling Bayesian Occupancy Filter. IEEE Intelligent Vehicles Symposium, Proceedings, pages 1307-1312, 2014.

The occupancy grid may be thresholded and connected components analysis may be then used to get the final object hypotheses. These hypotheses may be defined on the ground/grid space, thus they are desirably 2D and do not convey object-height information. Interactive image segmentation is desirably used, in order to add a third—height—dimension to the object hypotheses as shown in context of steps S50, S60. It should be noted that objects are considered in the disclosure as clusters of data rather than high-level abstractions with a semantic description. An object hypothesis could encompass not only moving objects such as cars and pedestrians but also static ones, including trees, walls or green areas.

In steps S50, S60 a graph cut guided densification is carried out. However, also any other energy minimisation method may be used. Due to the sparse nature of range measurements, the superpixel guided depth densification described in context of steps S20 and S30, S40 may in cases not be enough. In particular, lidar returns tend to be concentrated at the bottom of objects in the environment. As a result of this and the fact that objects have heterogeneous appearances, super-pixels with range measurements do not always cover entire objects. In order to further extend depth measurements so that depth estimates are available for entire object hypotheses, it is proposed a self-supervised segmentation procedure based on the graph-cuts algorithm for interactive foreground/background segmentation, as further described e.g. by C. Rother, V. Kolmogorov, Y. Boykov, and A. Blake. Interactive Foreground Extraction using graph cut. Technical report, Microsoft, 2011.

This Section starts with a summary of the graph Cut model applied to image segmentation, as described e.g. by A. Blake, P. Kohli, and C. Rother. Markov Random Fields for Vision and Image Processing. The MIT Press Cambridge, 2011.

It then explains how this model was extended to perform interactive foreground extraction by Rother et. al., and how it may be used as a self-supervised method for performing lidar-aided object segmentation.

In interactive segmentation it is aimed at segmenting out the foreground from the background based on foreground and background appearance models that are known a-priori. These models can be assembled from user input or as in our methodology from an initial lidar-based segmentation TF. It may be started by formulating an energy function that encodes the trade-off between a good pixel-wise segmentation and spatial coherence. A good segmentation will follow the distributions provided by an initial segmentation but it will also enforce spatial smoothness. This trade-off can be captured by an energy function of the form:

$$E(x,w,z)=U(x,w,z)+V(x,z), \quad (1)$$

where x is an element of $\{0, 1\}$ and represents the segmentation output, $\omega=\{h_B(z_i); h_F(z_i)\}$ corresponds to the colour distributions for background and foreground parametrised via Gaussian Mixture Models (GMMs). The term U measures the fit of the segmentation x to the data z, given the model $\omega$. It is proposed to initialise the parameter $\omega$ based on the initial segmentation provided by our super-pixel guided depth extrapolation module as described in context of steps S20, S30, S40 above. Finally, V is a smoothness term that encourages nearby pixels to have the same label. The optimal segmentation is obtained by jointly optimising $\omega$ and x as follows:

$$\hat{x} = \operatorname*{argmin}_{x} \min_{w} E(x, w, z) \quad (2)$$

Optimisation is performed by iteratively updating the segmentation x using graph cuts and the parameters $\omega$ using the Expectation Maximisation (EM) algorithm, as described in A. P. Dempster, N. M. Laird, and D. B. Rubin. Maximum Likelihood from Incomplete Data via the EM Algorithm. Journal of the Royal Statistical Society. Series B: Statistical Methodology (JRSS), 39(1):1-38, 1977.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. An electronic device for augmenting image data of a passive optical sensor, the electronic device comprising:
    a processor configured to:
        receive first image data of a passive optical sensor, the first image data comprising a plurality of pixels in an image plane;
        receive second data of an active sensor, the passive optical sensor and the active sensor sensing the same scene, the active sensor comprising a plurality of scan areas distributed over the scene, the second data comprising measurement values at returned scan areas;
        identify at least one cluster based on a distribution of returned scan areas;
        project the cluster onto the image plane;
        identify pixels which match with the projected cluster in the image plane; and
        augmenting the first image data of the passive optical sensor with the second data of the active sensor by associating the identified pixels with second data of the matching cluster, thereby obtaining a new multi-modal image-like representation,
        wherein each identified pixel comprises measurement values from the second data.

2. The electronic device according to claim 1, wherein the processor being further configured to:
    project the second data onto the image plane by transforming the coordinate system of the second data such that it matches with the coordinate system of the first image data.

3. The electronic device according to claim 1, wherein the processor is configured to:
    determine for each cluster a set of state information based on measurement values at returned scan areas within the cluster, the set of state information including at least one of the distance, the size, and the velocity of the cluster.

4. The electronic device according to claim 1, wherein a cluster is determined by an occupancy grid mapping algorithm.

5. The electronic device according to claim 1, wherein each associated pixel comprises image information and state information of the associated cluster, meanwhile each pixel, which is not associated with a cluster, only comprises image information.

6. The electronic device according to claim 1, the processor being further configured to:
    decompose the first image data into a set of superpixels, a superpixel comprising a plurality of neighboring pixels, and
    define an object of interest in the image plane by associating neighboring superpixels with a matching cluster.

7. The electronic device according to claim 1, wherein a superpixel is determined by identifying at least one of: (i) neighboring pixels with a similar color distribution: and (ii) edges in the first image data.

8. The electronic device according to claim 1, the processor being further configured to:
    associate a superpixel with second data of the matching cluster.

9. The electronic device according to claim 1, the processor being further configured to:
    create an object appearance model of an object of interest, the object appearance model representing an estimation for a color distribution of the object of interest.

10. The electronic device according to claim 9, the processor being further configured to:
    create a background appearance model based on superpixels surrounding an object of interest, the background appearance model representing an estimation for the color distribution of a background in the scene.

11. The electronic device according to claim 10, the processor being further configured to:
    redefine a border of the object of interest based on at least one of the object appearance model of the object of interest and the background appearance model.

12. The electronic device according to claim 11, the processor being further configured to:
    associate each pixel of the redefined object of interest with second data of the object of interest.

13. The electronic device according to claim 1, wherein the passive optical sensor is a digital camera.

14. The electronic device according to claim 13, wherein the active sensor is a radar or an active optical sensor.

15. A system for augmenting image data of a passive optical sensor, comprising:
the electronic device according to claim 1,
a passive optical sensor, and
an active sensor, wherein
the passive optical sensor and the active sensor are positioned to sense the same scene.

16. A vehicle comprising:
a system according to claim 15.

17. A method of augmenting image data of a passive optical sensor, the method comprising:
receiving first image data of a passive optical sensor, the first image data comprising a plurality of pixels in an image plane;
receiving second data of an active sensor, the passive optical sensor and the active sensor sensing the same scene, the active sensor comprising a plurality of scan areas distributed over the scene, the second data comprising measurement values at returned scan areas;
identifying at least one cluster based on a distribution of returned scan areas, projecting the cluster onto the image plane;
identifying pixels which match with the projected cluster in the image plane; and
augmenting the first image data of the passive optical sensor with the second data of the active sensor by associating the identified pixels with second data of the matching cluster, thereby obtaining a new multi-modal image-like representation,
wherein each identified pixel comprises measurement values from the second data.

* * * * *